United States Patent
Wilton

(10) Patent No.: US 10,649,962 B1
(45) Date of Patent: May 12, 2020

(54) ROUTING AND TRANSLATING A DATABASE COMMAND FROM A PROXY SERVER TO A DATABASE SERVER

(71) Applicant: Amazon Technologies, Inc., Seattle, WA (US)

(72) Inventor: Jeremiah C. Wilton, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 312 days.

(21) Appl. No.: 15/615,728

(22) Filed: Jun. 6, 2017

(51) Int. Cl.
*G06F 16/182* (2019.01)
*G06F 16/17* (2019.01)
*G06F 16/33* (2019.01)

(52) U.S. Cl.
CPC ...... *G06F 16/1844* (2019.01); *G06F 16/1734* (2019.01); *G06F 16/3332* (2019.01)

(58) Field of Classification Search
CPC ............. G06F 16/1844; G06F 16/3332; G06F 16/1734
See application file for complete search history.

(56) References Cited

U.S. PATENT DOCUMENTS

| | | |
|---|---|---|
| 6,173,322 B1 | 1/2001 | Hu |
| 6,549,934 B1 | 4/2003 | Peterson et al. |
| 8,966,112 B1 | 2/2015 | Franke et al. |
| 2002/0188616 A1 | 12/2002 | Chinnici et al. |
| 2005/0038873 A1 | 2/2005 | McCarthy |
| 2005/0246338 A1* | 11/2005 | Bird ............... G06F 21/6227 |
| 2008/0097960 A1 | 4/2008 | Dias et al. |
| 2009/0019517 A1 | 1/2009 | Turakhia |
| 2010/0185645 A1 | 7/2010 | Pazdziora |
| 2012/0179787 A1 | 7/2012 | Walsh et al. |
| 2014/0214890 A1 | 7/2014 | Johnson |
| 2014/0269296 A1* | 9/2014 | Khaddam ............ H04L 45/24 370/235 |
| 2015/0046487 A1 | 2/2015 | Yamada |
| 2015/0095343 A1 | 4/2015 | Divilly et al. |

(Continued)

OTHER PUBLICATIONS

Sheth et al., Federated Database Systems for Managing Distributed, Heterogeneous, and Autonomous Databases 1990, ACM Computing Surveys, vol. 22 No. 3, pp. 183-236.*

(Continued)

*Primary Examiner* — Jason G Liao
(74) *Attorney, Agent, or Firm* — Davis Wright Tremaine LLP

(57) ABSTRACT

The routing of commands within a database cluster is managed by a proxy server. The database cluster is comprised of a master database and at least one read-replica database. When the proxy server receives a database command, the proxy server determines whether the command is capable of being translated into an alternate command that can be executed on the read-replica database. If the command is not capable of being reliably translated, the database command is executed on the master database. If the command is capable of being executed on a read-replica database, the proxy server translates the database command into an alternate command that is compatible with the read-replica database, and executes the alternate command on the read-replica database. If results are returned from the read-replica database, the results may be converted into a format produced by the master database.

20 Claims, 11 Drawing Sheets

(56) References Cited

U.S. PATENT DOCUMENTS

| | | | |
|---|---|---|---|
| 2015/0248457 A1* | 9/2015 | Sawaf | G06F 16/2452 705/26.41 |
| 2017/0003998 A1* | 1/2017 | Kelly | G06F 9/45558 |
| 2017/0116615 A1 | 4/2017 | Burgess et al. | |
| 2017/0323111 A1 | 11/2017 | Hernandez Gonzalez et al. | |

OTHER PUBLICATIONS

Authoritative vs. Recursive DNS Servers: What's the Difference? Jul. 17, 2013, dnsmadeeasy.com, http://social.dnsmadeeasy.com/blog/authoritative-vs-recursive-dns-servers-whats-the-difference/.*

Macgregor, Ariel—A Semantic Front-End to Relational DBMSs 85, Procedings of VLDB 85, pp. 305-315.*

Successful Searching in Dialog Jul. 1998, The Dialog Corporation, pp. intro, TOC, 1-5, 8.*

Retif, How to query readonly replica in Always on cluster Mar. 24, 2015, stackexchange, https://dba.stackexchange.com/questions/96000/how-to-query-readonly-replica-in-always-on-cluster.*

Wilton, J., et al., "Migrating Data Between Databases," U.S. Appl. No. 14/985,132, filed Dec. 30, 2014.

Microsoft, "SQL Server Connection Pooling (Ado.Net)," Mar. 29, 2017, retrieved Jun. 19, 2019, from https://docs.microsoft.com/en-us/dotnet/framework/data/adonet/sql-server-connection-pooling, 8 pages.

Fielding et al., "Hypertext Transfer Protocol (Http/1.1 ): Caching," Request for Comments: 7234, Standards Track, Jun. 2014, 44 pages.

Fielding et al., "Hypertext Transfer Protocol (Http/1.1 ): Conditional Requests," Request for Comments: 7232, Standards Track, Jun. 2014, 29 pages.

Fielding et al., "Hypertext Transfer Protocol (Http/1.1 ): Message Syntax and Routing," Request for Comments: 7230, Standards Track, Jun. 2014, 90 pages.

Fielding et al., "Hypertext Transfer Protocol (Http/1.1): Authentication," Request for Comments: 7235, Standards Track, Jun. 2014, 20 pages.

Fielding et al., "Hypertext Transfer Protocol (Http/1.1): Range Requests," Request for Comments: 7233, Standard Track, Jun. 2014, 26 pages.

Fielding et al., "Hypertext Transfer Protocol (Http/1.1): Semantics and Content," Request for Comments: 7231, Standards Track, Jun. 2014, 95 pages.

Fielding et al., "Hypertext Transfer Protocol—Http/1.1," Request for Comments: 2616, Standards Track, Jun. 1999, 165 pages.

Server Fault, "Proxy for database server/connection?," Sep. 23, 2010, retrieved Mar. 30, 2017, from http://serverfault.com/questions/184066/proxy-for-database-server-connection, 2 pages.

Vaqqas, "RESTful Web Services: A Tutorial," Dr. Dobbs.com, Sep. 23, 2014, retrieved Mar. 30, 2017, from http://www.drdobbs.com/web-development/restful-web-services-a-tutorial/240169069, 9 pages.

Wikipedia, "Connection pool," May 20, 2016, retrieved Mar. 30, 2014, from https://en.wikipedia.org/wiki/Connection_pool, 2 pages.

\* cited by examiner

US 10,649,962 B1

ROUTING AND TRANSLATING A DATABASE COMMAND FROM A PROXY SERVER TO A DATABASE SERVER

BACKGROUND

Database servers are an important part of many modern computing systems. A database server retains information in an organized data store which is managed by a database service. For example, a business may use one or more database servers to retain client information, product information, supply chain data, and inventory information. Information retained in a particular database may be related to other information in the particular database or in other databases. If a business's needs change, database servers may need to be modified to retain additional information or to provide additional processing capability. Modification of a database server can be risky because of the vast amounts of valuable information involved. Transitioning a database engine from one vendor to another can be particularly challenging because database engines provided by different vendors are often not fully compatible. For example, particular database features implemented by one vendor may not be implemented by another vendor and vice versa. As a result, once committed to a particular database vendor, customers are reluctant to change to another vendor.

BRIEF DESCRIPTION OF THE DRAWINGS

Various techniques will be described with reference to the drawings, in which.

DETAILED DESCRIPTION

Figure 1:
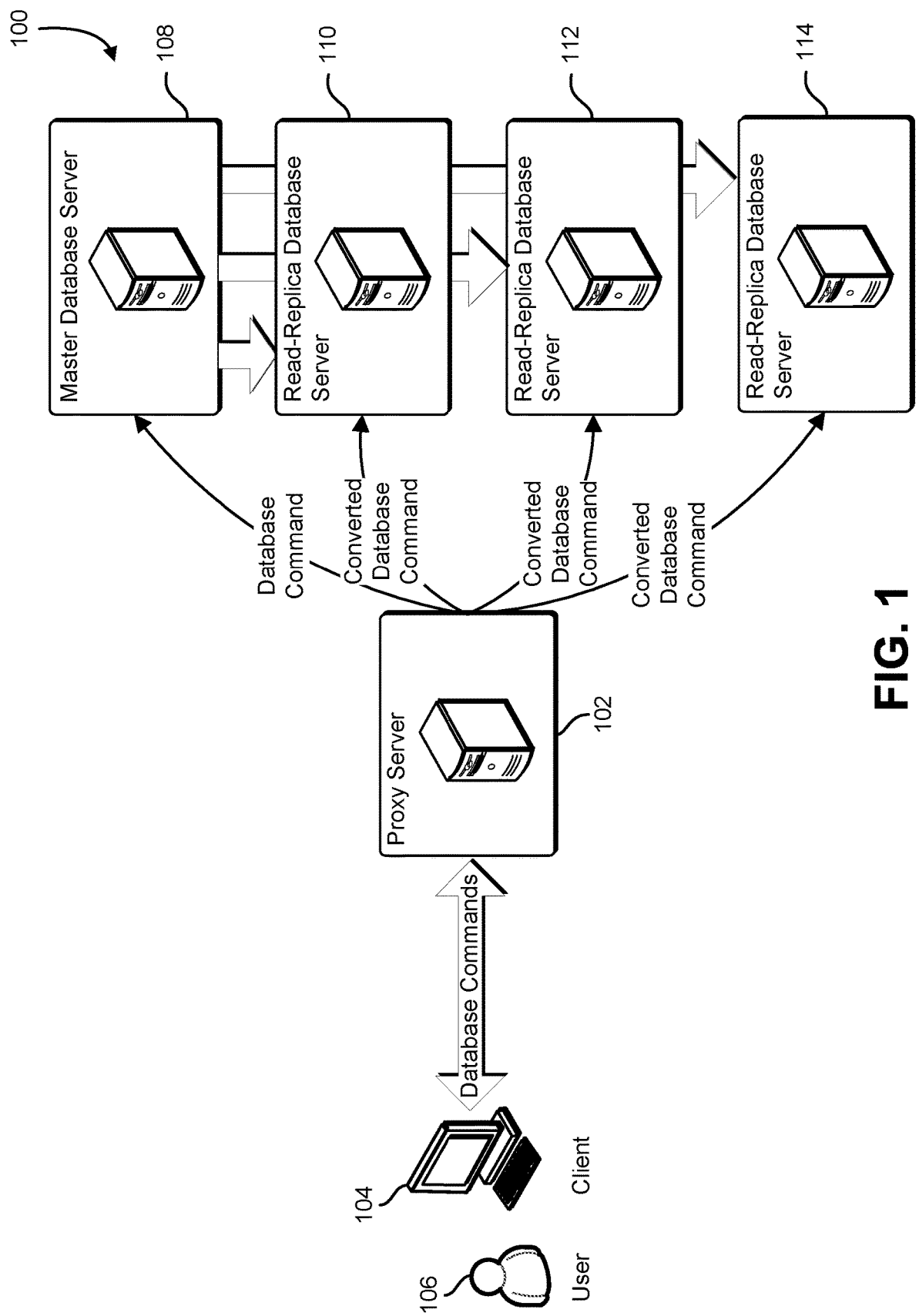
FIG. 1 shows a system in accordance with one embodiment.

The present document describes a system that uses a proxy server to manage the routing of database commands to individual databases in a heterogeneous database cluster. In an embodiment, a heterogeneous database cluster is a database that may have individual database servers that utilize different hardware, database engines, database schema, or data models. In an embodiment, a database cluster is a collection of two or more databases that operate together to provide increased processing capability, storage space, or reliability. In an embodiment, a database cluster includes a master database server that maintains a master database, and a number of read-replica databases that maintain copies of the master database. In an embodiment, read or write operations are routed to the master database server, and read operations are routed to one of the read-replica databases. In an embodiment, if the contents of the master database change, the contents of the read-replica databases are also changed to match the contents of the master database. In an embodiment, a heterogeneous cluster is a database cluster where individual database servers within the database cluster may be different from each other. In an embodiment, individual database servers of a heterogeneous cluster may have database engines that are supplied by different software vendors, or may have different versions of a database engine supplied by a single software vendor. As a result, different database servers within a heterogeneous database cluster may, in an embodiment, have slightly different capabilities. For example, in an embodiment, a particular structured query language ("SQL") operation supported by one database server in a heterogeneous database cluster may not be supported by another database server in the heterogeneous database cluster. In an embodiment with heterogeneous read-replica databases, the master database may operate using a different database engine, a different command language dialect, or a different server infrastructure than the read-replica databases. In an embodiment, a customer may offload processing load from a master database having a first database engine type to one or more read-replica databases having a different database engine type. A customer may find this embodiment useful when offloading database load from an expensive proprietary master database to one or more less-expensive open-source read-replica databases.

In an embodiment having a database cluster with heterogeneous read-replica databases, a proxy server acts as an intermediary between a database client and the database cluster. In an embodiment, a database command is sent by the database client to the proxy server, and the proxy server routes the database command to one of the databases in the database cluster. In an embodiment, if the command modifies the data stored in the database cluster, the command is known as a write command. In an embodiment, the proxy server routes write commands to the master database. If the command is not a write command (a read command), in an embodiment, the proxy server routes the database command to the master database server or one of the read-replica databases in the database cluster. In an embodiment, the read-replica database servers in a heterogeneous database cluster implement a different command language than the master database server in the database cluster. A particular command language may be referred to as a dialect. For example, individual implementations of SQL language may be implemented in accordance with a variety of different SQL dialects that are similar, but not identical to each other. In an embodiment, the proxy server modifies the commands submitted by the client computer system so that the modified commands are compatible with the command language implemented by the database server to which the command is routed. In an embodiment, the client computer system submits commands that are compatible with (using the command language implemented by) the master database server, and if the proxy server routes an incoming command to a read-replica database, the proxy server modifies the command in accordance with the command dialect supported by the read-replica database. In an embodiment, when results are provided by the read-replica database, the results are modified by the proxy server to appear as if they came from the master database server. In an embodiment, the client computer system submits database commands in an intermediate command language, and the intermediate commands are converted by the proxy server (or a command translation service at the direction of the proxy server) to a command language based at least in part on the database server to which the command is to be routed.

In an embodiment, the proxy server is a server that provides a database interface over a computer network at an IP address. In an embodiment, the proxy server receives database commands, such as SQL commands, and routes the commands to a selected server in a database cluster. In an embodiment, the proxy server routes insert, delete and merge commands to a master database that maintains an up-to-date copy of the database for the cluster. In an embodiment, the proxy server routes select commands to a read-replica database in the cluster. In an embodiment, this kind of horizontal scaling provides the client with the convenience of not having to modify the application to route reads and writes to different database servers in the database cluster.

In an embodiment, a read-replica database in a database cluster implements a different command language than a master database in the database cluster. In an embodiment, the proxy server modifies incoming database commands to be compatible with the particular server to which each individual command is routed. In an embodiment, database commands submitted to the proxy server by the client are submitted in a form that is compatible with the master database. In an embodiment, a read-replica database implements a command language that is at least partially different than the command language supported by the master database. In an embodiment, if the proxy server routes a command to the read-replica database, the proxy server, performs a conversion that modifies the incoming database command to be compatible with the read-replica database. In an embodiment, if the read-replica database provides results in response to the database command, the proxy server converts the results so that the results appear in a format that would be produced by the master database. In an embodiment, the master database uses a database engine that is different than the database engine supporting the read-replica database.

In an embodiment, the proxy server may route a particular read command to the master database server in certain situations. In an embodiment, if the proxy server determines that the database command provided by the client is not convertible, the proxy server routes the database command to the master database server. In an embodiment, if the proxy server determines that the database command requires the most recent copy of the database, the database command is routed to the master database server. In an embodiment, if the proxy server determines that the conversion of the database command is unreliable, the database command is routed to the master database server.

In an embodiment, database commands are converted by the proxy server using a translation service operating on the proxy server. In an embodiment, database commands are converted using a command-translation service operating on another computer system. In an embodiment, the command-translation service is a web service.

FIG. 1 shows an illustrative example of a system in which various embodiments may be practiced. A system diagram 100 shows an embodiment of a system that includes a proxy server 102 that acts as an intermediary between a client computer system 104 operated by a user 106, and a database cluster. In an embodiment, using the client computer system 104, the user 106 generates one or more database commands which are sent to the database cluster via the proxy server 102. In an embodiment, a database command may be an SQL command, vendor-specific database command, or other instruction to be performed by the database cluster. In an embodiment, the client computer system 104 may be a personal computer, portable computer, laptop computer, mobile device, network appliance, wearable device, or other computing device. In an embodiment, the client computer system 104 generates the database commands using a database client application. In an embodiment, the database client application is a web browser. In an embodiment, the database client application is a database driver.

In an embodiment, the database cluster is comprised of a master database server 108, a first read-replica database server 110, a second read-replica database server 112, and a third read-replica database server 114. In an embodiment, the master database server 108 retains a master database that acts as an authoritative source of information retained by the database cluster. In an embodiment, the master database server 108 may be implemented as a plurality of synchronized servers. In an embodiment, each read-replica database retains a copy of at least part of the information maintained on the master database server 108. In an embodiment, the master database server 108 periodically replicates the information from the master database to each of the read-replica database servers. In an embodiment, the master database server 108 replicates information from the master database server to each of the read-replica database servers when information retained on the master database server 108 is modified. In an embodiment, each read-replica database server may implement a different command set than the master database server 108. In an embodiment, the first read-replica database server 110 implements a different dialect of SQL than the master database server 108. In an embodiment, the second read-replica database server 112 implements a subset of the database commands supported by the master database server 108. In an embodiment, the third read-replica database server 114 accepts database commands in accordance with a different syntax than the master database server 108. In another implementation, a read-replica database server accepts database commands over a different interface in the master database server 108.

Different databases may store the data differently. In an embodiment a database may encrypt information retained in the database while another database may not. In an embodiment, different databases may store data in accordance with different schemas. In an embodiment, databases may store data using different data types and different data encodings. In an embodiment, a database may be used to store images, sound files, multi-media, or binary blocks of data. In an embodiment, copying data from one database to another may include conversion of the underlying data from one form to another.

In an embodiment, a database command is submitted from the client computer system 104 to the proxy server 102 in accordance with the capabilities of the master database server 108. In an embodiment, the proxy server 102 makes a determination as to whether the database command is capable of being fulfilled by one of the read-replica database servers. In an embodiment, the proxy server 102 determines whether the database command, when executed, would alter the information maintained on the master database server 108. In an embodiment, the proxy server determines that the database command will alter the information on the master database server 108 when the database command is not a query command. In an embodiment, the proxy server determines that the database command will alter the information on the master database server 108 when the database command is an insert, delete, or merge command. In an embodiment, the proxy server determines the database command will modify the information on the master database server 108 when the database command is a command that alters the database schema on the master database server 108.

In an embodiment, if the proxy server 102 determines that the database command will alter the information on the master database server 108, the proxy server 102 sends the database command to the master database server 108, and causes the database command to be executed by the master database server 108. In an embodiment, if the master database server 108 returns results as a result of executing the database command, the proxy server 102 receives the results and relays them to the client computer system 104.

In an embodiment, if the proxy server 102 determines that the database command will not alter the information on the master database server 108, the proxy server may attempt to fulfill the database command using one of the read-replica database servers. In an embodiment, the proxy server 102 uses a command-translation service to translate the database command into a form that is compatible with each read-replica database server. In an embodiment, the command-translation service indicates whether or not the database command is capable of being translated into a form that is compatible with a particular read-replica database server. In an embodiment, if the command-translation service generates an alternate command, the command-translation service produces a level of confidence in the translation. In an embodiment, the proxy server 102 uses a variety of factors to determine whether an alternate command is routed to a read-replica database server. In an embodiment, the proxy server 102 uses a cost metric, and compares the cost of executing the database command on the master database server 108 to the cost of executing the alternate database command on each read-replica database server. In an embodiment, the proxy server 102 uses the level of confidence to determine whether the translation is sufficiently reliable, and if the level of confidence does not exceed a threshold level, the proxy server 102 will route the database command to the master database server 108. In an embodiment, the proxy server 102 routes the alternate command to a read-replica database server whenever one is successfully generated by the command-translation service. In an embodiment, the proxy server 102 selects from one of a number of read-replica database servers based at least in part on the processing load of each read-replica database server. In an embodiment, the proxy server 102 selects a particular read-replica database server from a number of read-replica database servers based at least in part on a data latency of each individual read-replica database, where data latency represents the time delay between the data on the master database server 108 and the individual read-replica database.

In an embodiment, if the proxy server 102 routes an alternate database command to a read-replica database server, results returned from the read-replica database server may be processed by the proxy server 102 before they are returned to the client computer system 104. In an embodiment, the results are modified so that the results appear to have come from the master database server 108. In an embodiment, the results are placed in a format that is in accordance with the data format produced by the master database server 108.

In an embodiment, the presence of a proxy server 102 allows a customer to implement a database cluster using a number of different database engines that may not be entirely compatible with each other. For example, in some embodiments, the master database server 108 may be an expensive proprietary database engine and each of the read-replica database servers may be implemented using low-cost open-source database implementations. In an embodiment, database commands that are capable of being rerouted to a low-cost read-replica database server are rerouted, reducing the need to add additional capacity to the master database server 108.

Figure 2:
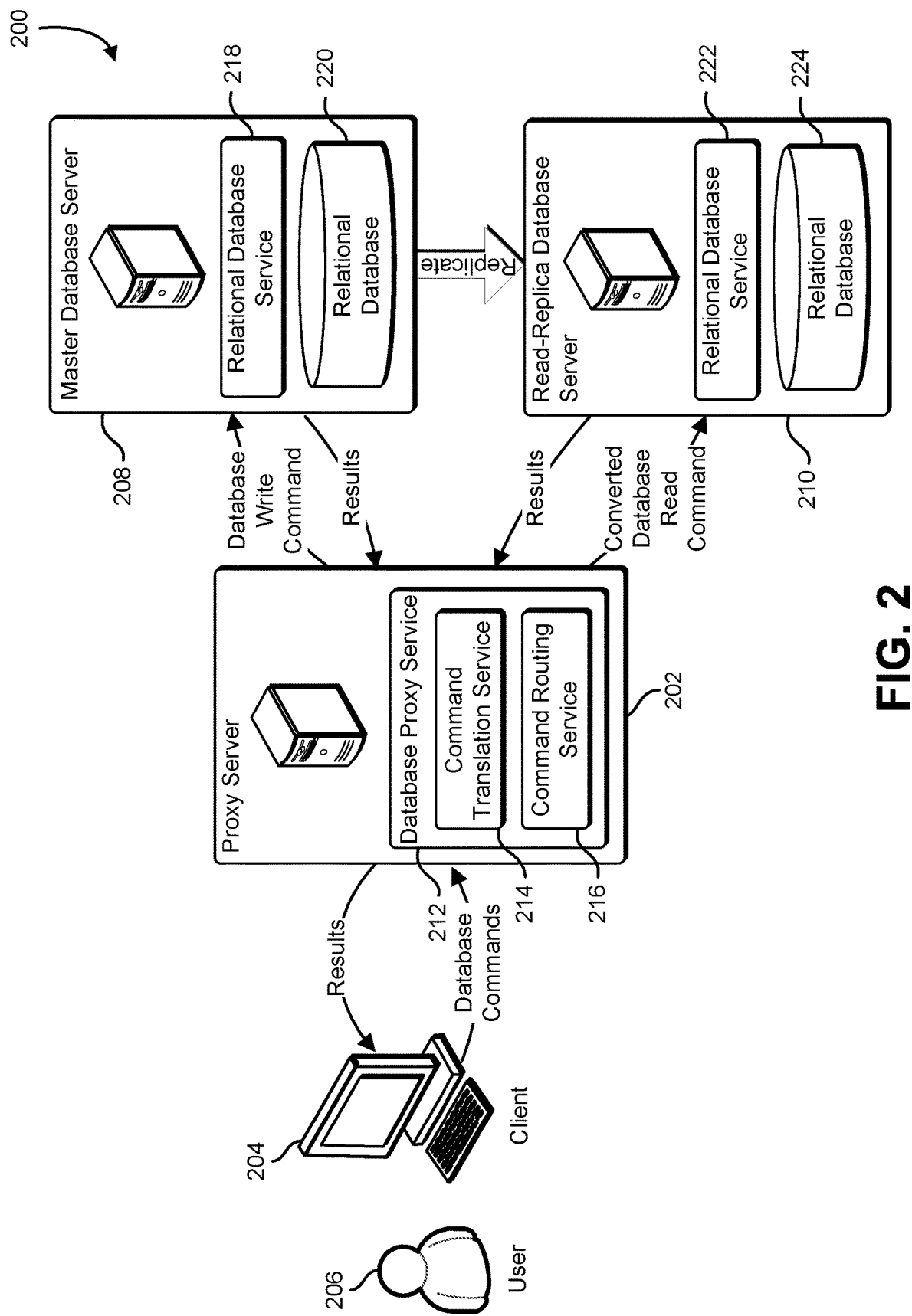
FIG. 2 shows an illustrative example of a proxy server in accordance with one embodiment.

FIG. 2 shows an illustrative example of a proxy server that routes database commands between a master database server and a read-replica database server, and translates individual database commands so that each individual database command is compatible with the database server to which the individual database command is routed. A block diagram 200 illustrates an embodiment where a proxy server 202 acts as an intermediary between the client computer system 204 and a cluster of database servers. In an embodiment, the client computer system 204 is operated by a user 206. In an embodiment, the client computer system may be a desktop computer system, a laptop computer system, a tablet computer system, a mobile computing device, cell phone, a network appliance, or other computing device capable of hosting a database client application. In an embodiment, the cluster of database servers includes a master database server 208 and a read-replica database server 210. In an embodiment, the master database server 208 retains an authoritative version of data maintained by the database cluster, and the read-replica database server 210 maintains a subordinate copy of the data.

In an embodiment, the master database server 208 is a server computer system, server cluster, virtual computer system, computing service, or other computing device that hosts a relational database service 218. In an embodiment, the relational database service 218 includes a database engine that is capable of receiving and executing database commands to perform operations on a relational database 220. In an embodiment, the relational database 220 contains information that is retained on a storage device such as a disk drive, disk array, optical drive, memory device, storage service, or removable memory device. In an embodiment, the relational database 220 may include indexes, metadata, and other information used by the relational database service 218 to provide rapid and efficient access to information. In an embodiment, the read-replica database server 210 includes a relational database service 222 and an associated relational database 224. In an embodiment, the read-replica database server 210 maintains a copy of at least a portion of the information stored in the relational database 220. In an embodiment, the master database server 208 and the read-replica database server 210 work together to replicate information that is updated on the master database server 208 to the read-replica database server 210. In an embodiment, the relational database service 218 detects changes to the relational database 220 and sends commands to the relational database service 222 to update the relational database 224 so that the relational database 224 is synchronized with a relational database 220. In an embodiment, the relational database service 218 on the master database server 208 records changes to the relational database 220 and periodically sends updates to the read-replica database server 210. In an embodiment, the master database server 208 records an amount of delay (or latency) associated with the read-replica database server 210. In an embodiment, the master database server 208 provides the latency to the command routing service 216 which uses the latency to determine, in some embodiments, whether to route a command to the read-replica database server or the master database server.

In an embodiment, the proxy server 202 is a network-connected computer system or network appliance that hosts a database proxy service 212. In an embodiment, the database proxy service 212 includes a command translation service 214 and a command routing service 216. In an embodiment, the command translation service 214 converts a database command that is compatible with a particular database server into an alternative command that is compatible with another database server that supports a different command set than the particular database server. In an embodiment, for example, a first database server supplied by one vendor may support a slightly different command set than a second database server supplied by another vendor. In an embodiment, the command translation service 214 is used to convert a database command intended to be run on the first database server into an equivalent command that can be run on the second database server. In an embodiment, the command translation service 214 is a service hosted by the proxy server 202. In an embodiment, the command translation service 214 is an online web service hosted by a third party server, and the database proxy service 212 accesses the command translation service via a secure web interface. In an embodiment, the command translation service 214 may modify the syntax of a particular database command to make the particular database command compatible with another database server. In an embodiment, when the command translation service 214 is provided with a source database command, the command translation service 214 is also provided with information that describes how the source command is formatted. In an embodiment, the command translation service 214 may also be provided with information that describes the format to which the source command should be converted. In an embodiment, the source and destination formats may be described by identifying the characteristics of the master database server and the reader-replica database server to which the command is directed after being translated. In an embodiment, a command format may be described by identifying a type of a database engine and a software version of the database engine.

In an embodiment, the database proxy service 212 includes command routing service 216. In an embodiment, the command routing service 216 receives database commands from the client computer system 204. In an embodiment, the database commands may be in the form of SQL commands, database configuration commands, vendor-specific database commands, or server configuration commands, which are intended to be executed by the database cluster. In an embodiment, the command routing service 216 is connected to a network interface in the proxy server 202, and the database commands are transmitted over the computer network by the client computer system 204. In an embodiment, the database commands are provided by the client computer system 204 in a format that is compatible with the master database server 208.

The command routing service 216 determines if an incoming command is eligible to be rerouted to a read-replica database server such as the read-replica database server 210. In an embodiment, the command routing service 216 determines if the incoming command, when executed, would alter data maintained by the database cluster. In an embodiment, for example, an add command, a delete command, or a merge command would likely modify data on the database cluster, whereas a query command would likely not modify data on the database cluster. In an embodiment, database commands that would modify data on the database cluster are referred to as write commands, and database commands that would not modify data on the database cluster are referred to as read commands. In an embodiment, if the incoming command would modify data on the data cluster, the incoming command is routed to the master database server 208. In an embodiment, if the incoming command would not modify the data on the data cluster, the command routing service 216 determines whether the incoming command can be translated into a form that is compatible with a read-replica database such as the read-replica database server 210.

In an embodiment, the command routing service 216 identifies a particular read-replica database server, and uses the command translation service 214 to attempt to generate an alternative command for the incoming command that is compatible with the particular read-replica database server. In an embodiment, the command translation service 214 either translates the incoming command and produces an alternative command or indicates to the command routing service 216 that the command cannot be translated. In an embodiment, when the command translation service 214 produces an alternative command, the command translation service 214 provides the command routing service 216 with a level of confidence that indicates the reliability of the translation. In an embodiment, the reliability indicates the probability that the alternative command will produce results that match the results of routing the incoming command to the master database server 208. In an embodiment, the command routing service 216 compares the level of confidence to a threshold value supplied by the user 206. In an embodiment, if the level of confidence is less than the threshold value, the command routing service 216 discards the alternative command and instead routes the incoming command to the master database server 208. In an embodiment, results that are returned to the command routing service 216 as a result of routing a command to the master database server 208 are relayed to the client computer system 204. In an embodiment, results that are returned to the command routing service 216 as a result of routing a command to the read-replica database server 210 may be modified so that the results appear to be returned from the master database server 208. In an embodiment, the modified results are relayed to the client computer system 204.

In an embodiment, the user 206 submits a database command to the proxy server via the client computer system 204. In an embodiment, the command is received by the command routing service 216. In an embodiment, the command routing service determines whether the command is a read command or a write command. In an embodiment, if the command is a write command, the command is routed to the master database server 208, executed, and results are returned to the command routing service 216. In an embodiment, if the command is a read command, the command is submitted to the command translation service 214 and the command translation service 214 produces an alternate command that is compatible with the read-replica database server 210. In an embodiment, the alternate command is routed to the read-replica database server 210, executed, and results are returned to the command routing service 216. In an embodiment, if results are returned from the read-replica database server 210, the command routing service 216 may convert the results so that the results appear to be in a format produced by the master database server 208.

Figure 3:
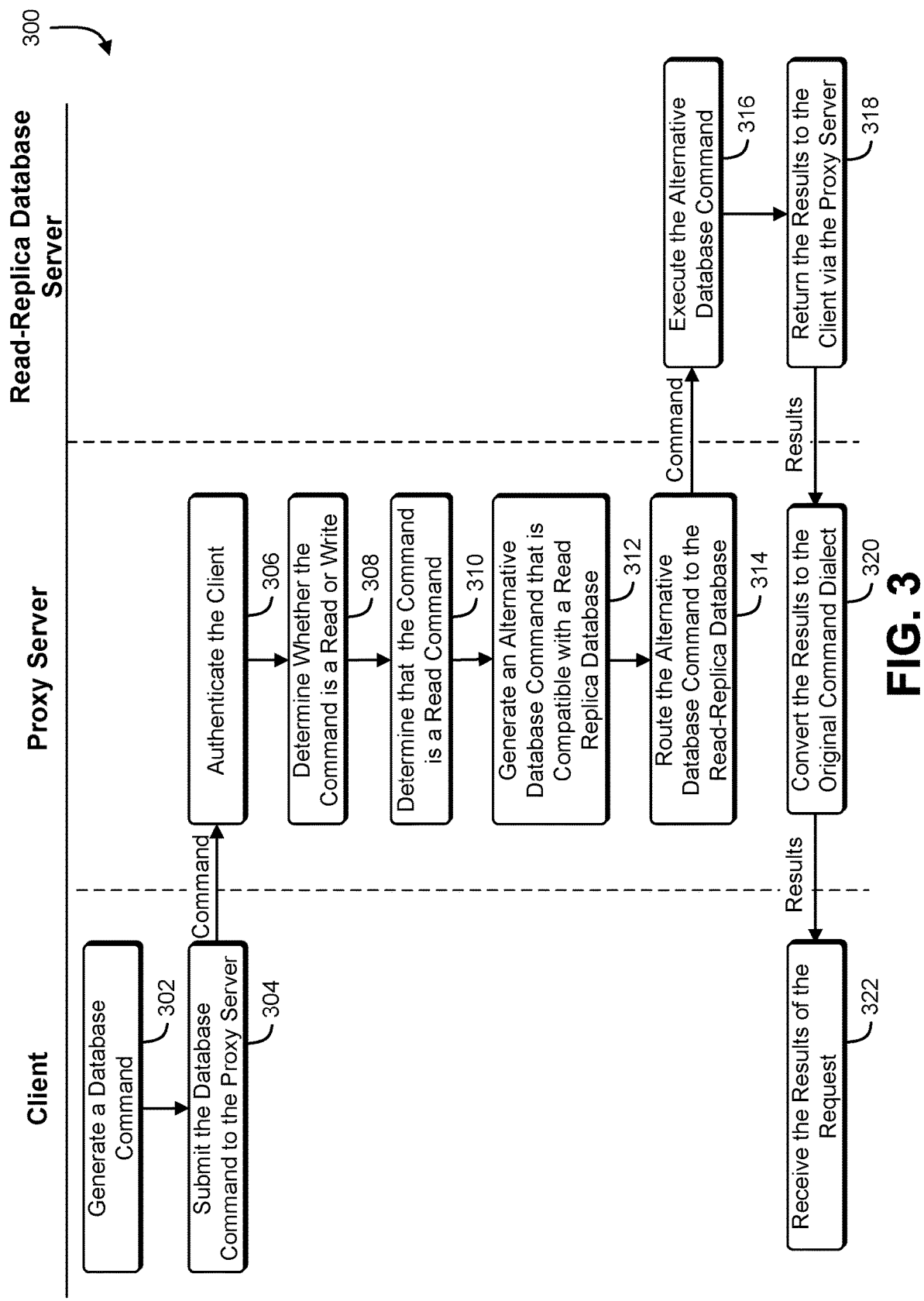
FIG. 3 shows an illustrative example of a process in accordance with one embodiment.

FIG. 3 shows an illustrative example of a process that, as a result of being performed by a client computer system, a proxy server, and a read-replica database server, converts a database command into a SQL dialect supported by the read-replica database server, executes the converted command on the read-replica database server, and returns results to the client computer system. In an embodiment, the read-replica database server is part of a database cluster, and the read-replica database server mirrors data contained on a master database server in the database cluster. A swim diagram 300 illustrates an embodiment of a process that begins at block 302 with the client computer system generating a database command. In an embodiment, the database command is a SQL command, database configuration command, vendor-specific database command, database definition language ("DDL") command, or other command supported by a database cluster. In an embodiment, at block 304, the client submits a database command to the proxy server. In an embodiment, the database command is submitted to the proxy server over a network to a network interface exposed by the proxy server.

At block 306, the proxy server receives the database command. In an embodiment, the proxy server authenticates the client computer system's information provided with the database command. In an embodiment, the client computer system provides credentials to the proxy server that verifies the identity of the client computer system and confirms that the client computer system is authorized to execute the database command. In an embodiment, the proxy server determines 308 whether the database command is a read command or write command. At block 310, in an embodiment, the proxy server determines that the command is a read command. In an embodiment, the read command is generally a database query. In an embodiment, if the proxy server determines that the command is a write command, the proxy server forwards the command to a master database for execution, and any results are returned to the client computer system. At block 312, in an embodiment, the proxy server generates an alternative database command based at least in part on the database command provided by the client computer system. In an embodiment, the alternative database command is constructed so that when executed on a read-replica database server, the results produced by executing the alternative command on the read-replica database server match the results that would be produced by executing the original command on the master database server. In an embodiment, the alternative command is generated by a translation service that converts commands intended for execution on one database server so that they are compatible with another database server. In an embodiment, the alternative command is generated using a different syntax than the original command. In an embodiment, a sequence of alternative commands is generated as a substitute for the original command. In an embodiment, at block 314, the proxy server routes the alternative command to the read-replica database server. In an embodiment, the proxy server may route the alternative command to the read-replica database server via a network interface between the proxy server and read-replica database server. In an embodiment, the proxy server may route the alternative command of the read-replica database using an application programming interface ("API") provided by the read-replica database server.

At block 316, the read-replica database server receives the alternative command from the proxy server. In an embodiment, the read-replica database server executes the alternative database command. In an embodiment, the read-replica database server produces a set of results as a result of executing the alternative database command. In an embodiment, at block 318, the read-replica database server returns the results to the proxy server.

At block 320, the proxy server receives the results from the read-replica database server. In an embodiment, the proxy server modifies the results so that the results appear to have come from the master database server in the database cluster. In an embodiment, the proxy server modifies the formatting of the results in accordance with the result format produced by the master database server. In an embodiment, the modified results are returned to the client computer system. At block 322, the client computer system receives the modified results from the proxy server. In an embodiment, upon completion of the process described above, the database command produced by the client computer system and submitted to the database cluster is fulfilled by being executed on the read-replica database server, even though the database command is formatted in accordance with the requirements of the master database server.

Figure 4:
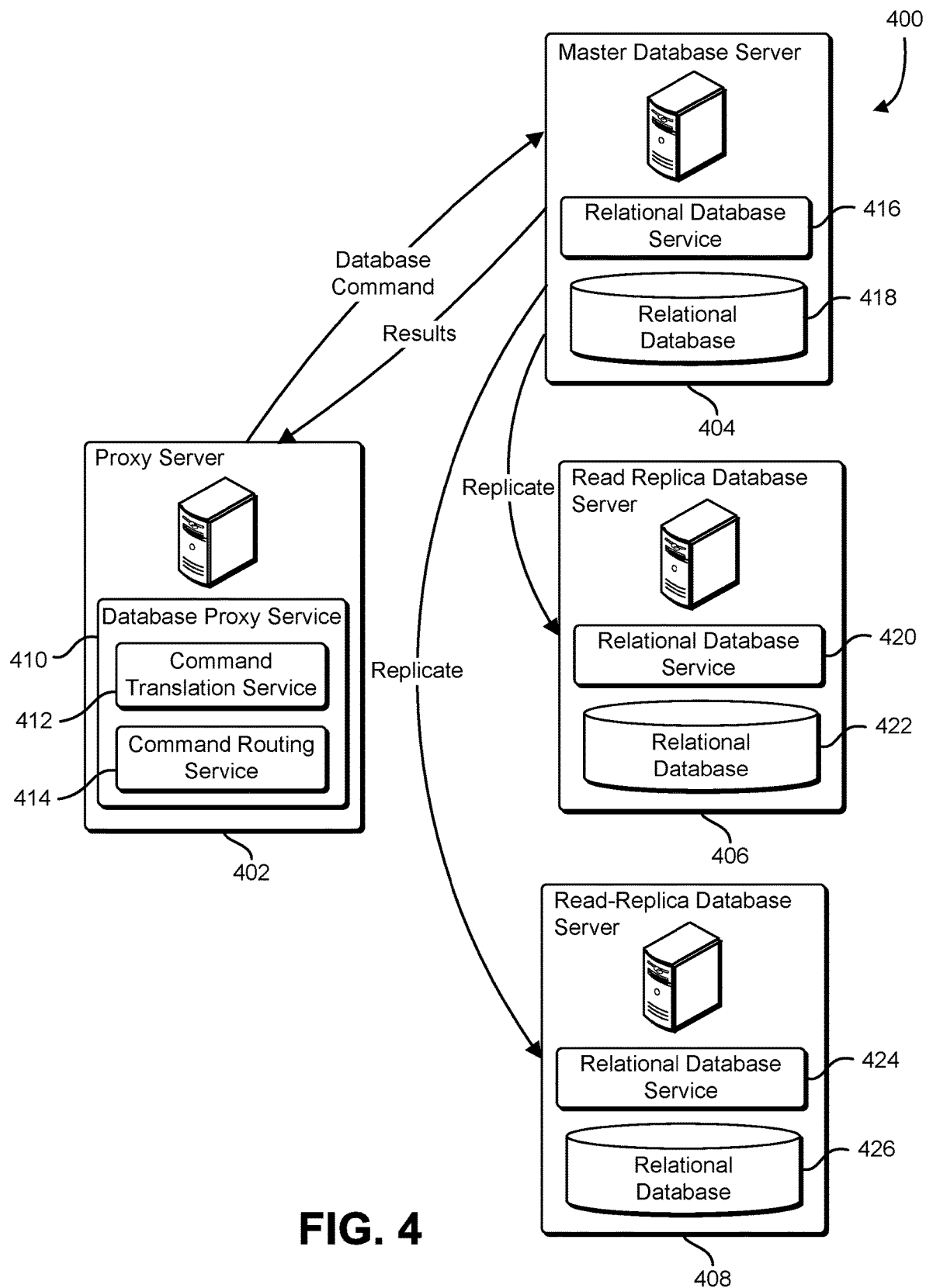
FIG. 4 shows an illustrative example of a database cluster in accordance with one embodiment.

FIG. 4 shows an illustrative example of a database cluster that, as a result of receiving a write database command at a master database server, replicates updated data to a first read-replica database server and a second read-replica database server. The system diagram 400 illustrates an embodiment of the proxy server 402 that acts as an interface to a database cluster. In an embodiment, the database cluster includes a master database server 404, a first read-replica database server 406, and a second read-replica database server 408. In an embodiment, the proxy server 402 hosts the database proxy service 410. In an embodiment, the database proxy service 410 includes a command translation service 412, and a command routing service 414. In an embodiment, the command translation service 412 converts database commands that are formatted for the master database server 404 into a format that is compatible with the first read-replica database server 406 or the second read-replica database server 408. In an embodiment, the command routing service 414 receives commands from one or more client computer systems, and based at least in part on the command received, the command routing service 414 may either forward the command to the master database server 404 or translate the command into alternative command and send the alternative command to one of the read-replica database servers.

In an embodiment, the master database server 404 hosts a relational database service 416 that maintains a relational database 418. In an embodiment, the relational database service 416 is a database engine that implements a command set. In an embodiment, when commands are routed by the proxy server 402 to the relational database service 416, the relational database service 416 executes the commands on the data within the relational database 418. In an embodiment, the relational database 418 is maintained on a storage device such as a disk drive, tape drive, optical drive, semiconductor memory device, or online storage device or service. In an embodiment, the first read-replica database server 406 hosts a relational database service 420. In an embodiment, the relational database service 420 is a database engine that implements a command set that may be different than the command set implemented by the master database server 404. The relational database service 420 executes database commands that operate on data maintained within a relational database 422. In an embodiment, the relational database 422 is a database that may be maintained on a storage device that is connected to the first read-replica database server 406. In an embodiment, the relational database 422 may be stored on a disk drive, optical storage drive, semiconductor memory device, online storage device, or other storage device that is accessible to the first read-replica database server 406. In an embodiment, the second read-replica database server 408 includes a relational database service 424. In an embodiment, the relational database service 424 is a database engine that implements a command set that may be different than the command set implemented by the master database server 404 and the first read-replica database server 406. In an embodiment, the relational database service 424 executes database commands that operate on data maintained within a relational database 426. In an embodiment, the relational database 426 is a database that may be maintained on a storage device that is connected to the second read-replica database server 408. In an embodiment, the relational database 426 may be stored on a disk drive, optical storage drive, semiconductor memory device, online storage device, or other storage device that is accessible to the second read-replica database server 408.

In an embodiment, when a command is received by the command routing service 414, the command routing service 414 determines whether the command can be fulfilled by a read-replica database server. In an embodiment, if the command is a write command, the command is routed to the master database server 404. In an embodiment, if the command is a command that is unable to be converted into an alternate command compatible with either the first read-replica database server 406 or the second read-replica database server 408, the command is routed to the master database server 404. In an embodiment, the command translation service 412 produces an alternate command for the command, and also provides a reliability measure for the translation. In an embodiment, if the reliability measure for the translation is less than the threshold value, the original command is sent to the master database server 404. In an embodiment, the command routing service 414 uses the command translation service 412 to generate alternate commands for the first read-replica database server 406 and the second read-replica database server 408, and compares the reliability measures of each alternate command to determine which read-replica database server is to be used. In an embodiment, each read-replica database server maintains a replica of the information in the relational database 418 with an associated latency value. In an embodiment, the database command routed to the proxy server 402 includes a maximum latency value, and a read-replica database server is selected that is able to satisfy the maximum latency value. In an embodiment, if no read-replica database server has a latency value less than the maximum latency value, the database command is sent to the master database server 404.

In an embodiment, when a write command is received by the proxy server 402, command routing service 414 routes the write command to the master database server 404 for execution. In an embodiment, the relational database service 416 executes the write command, which updates the information in the relational database 418. In an embodiment, the master database server 404 periodically performs an update of the read-database servers in the database cluster. In an embodiment, the maximum time between database updates may be configured by an administrator. In an embodiment, the master database server 404 updates the information in the relational database 422 and the relational database 426 to be in synchronization with the relational database 418. In an embodiment, the master database server 404 provides latency information to the command routing service 414 describing the delay between information contained in the relational database 418 and the individual read-replica database servers.

Figure 5:
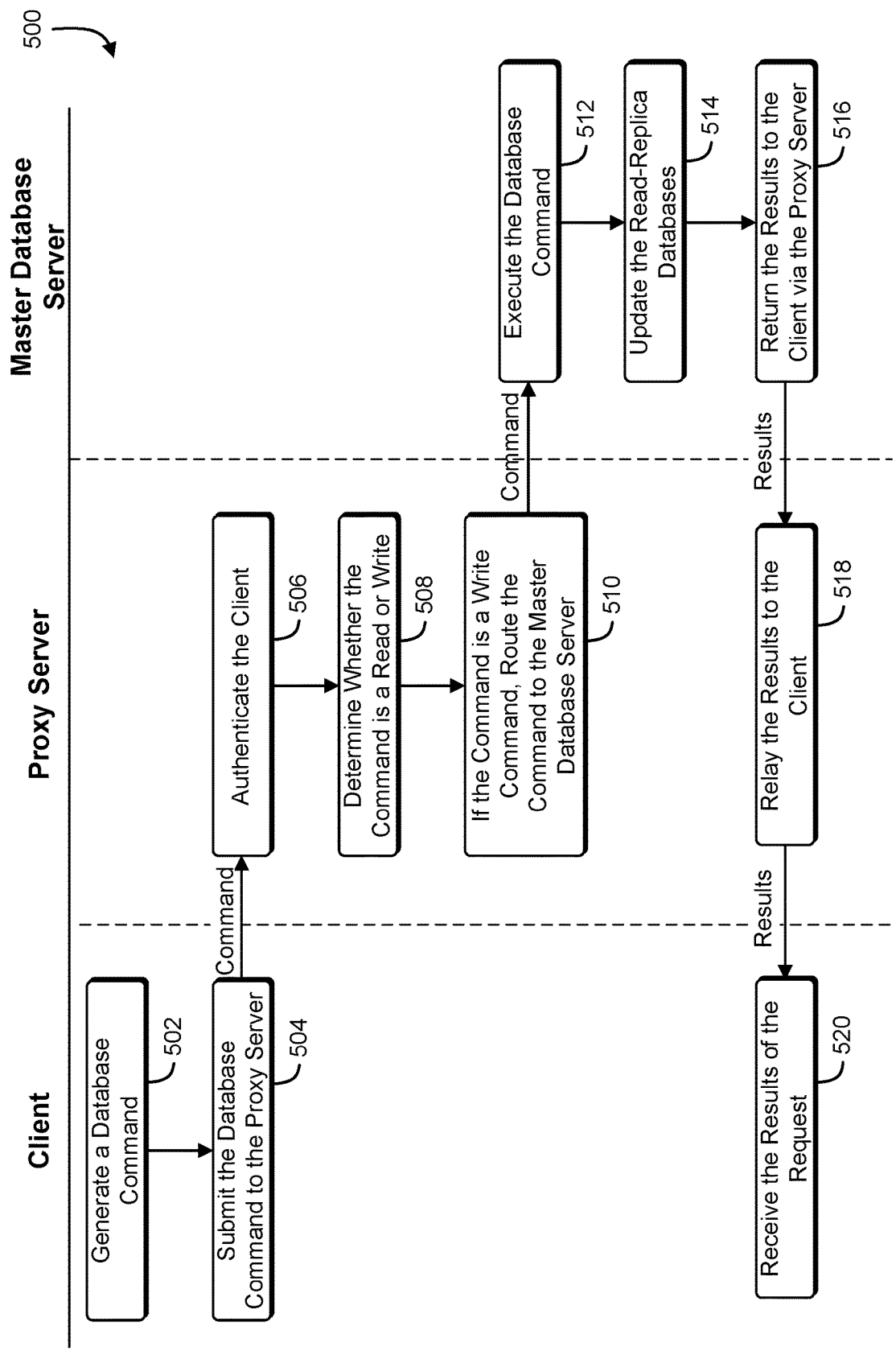
FIG. 5 shows an illustrative example of a process in accordance with one embodiment.

FIG. 5 shows an illustrative example of a process that, as a result of being performed by a client computer system, a proxy server, and a master database server, routes a write operation to the master database server, performs the write operation, and updates one or more read-replica databases. In an embodiment, a database cluster is comprised of the master database server and one or more read-replica database servers. A swim diagram 500 illustrates an embodiment of a process that begins at block 502 with a client computer system generating a database command. In an embodiment, the database command may be generated by an application running on the client computer system using a database driver. In an embodiment, at block 504, the client computer system sends the database command to the proxy server. In an embodiment, the client computer system sends the database into the proxy server over network connection to a network interface provided by the proxy server.

At block 506, the proxy server receives the database command from the client computer system. In an embodiment, the proxy server authenticates the client computer system's information provided with the database command. In an embodiment, the client computer system provides credentials to the proxy server that verifies the identity of the client computer system and confirms that the client computer system is authorized to execute database commands. In an embodiment, the proxy server determines 508 whether the database command is a read command or write command. At block 510, in an embodiment, if the proxy server determines that the command is a write command at block 510, the proxy server forwards the command to a master database for execution. In an embodiment, if the proxy server determines that the command is a read command, the command is routed to a read-replica database as shown in FIG. 3. In an embodiment, the proxy server may route the command to the master database server via a network interface between the proxy server and master database server. In an embodiment, the proxy server may route the command of the master database using an application programming interface ("API") provided by the master database server.

At block 512, the master database server receives the database command from the proxy server. In an embodiment, the master database server executes the database command. In an embodiment, the master database server produces a set of results as a result of executing the database command. In an embodiment, at block 514, the master database server updates information in read-replica databases in the database cluster. In an embodiment, at block 516, the master database server returns the results to the proxy server. At block 518, the proxy server receives the results from the master database server and relays the results to the client computer system. At block 520, the client computer system receives the results from the proxy server.

Figure 6:
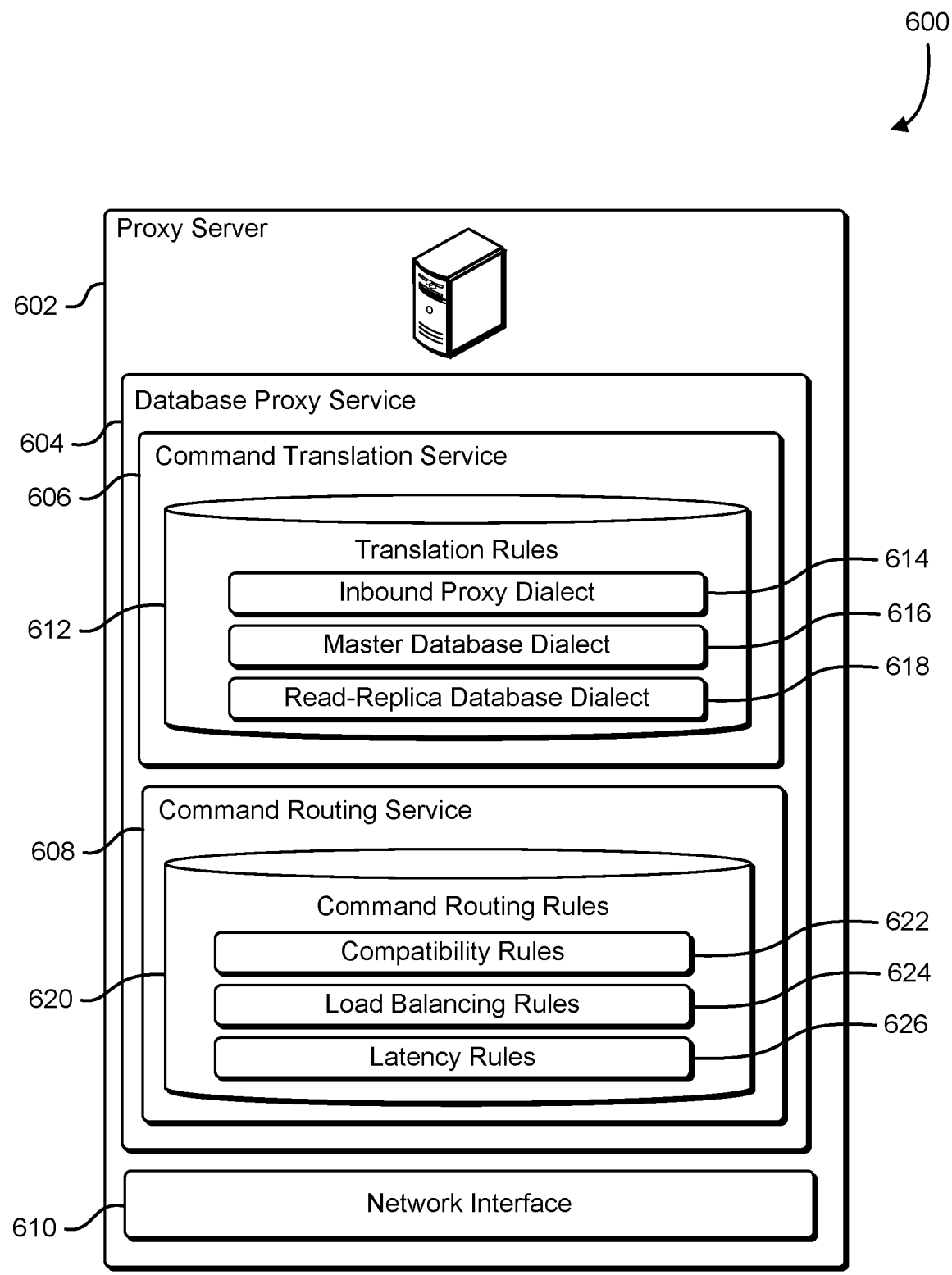
FIG. 6 shows an illustrative example of a proxy server in accordance with one embodiment.

FIG. 6 shows an illustrative example of a proxy server that routes database commands to various databases in a heterogeneous database cluster. A diagram 600 shows an embodiment of a proxy server 602. In an embodiment, the proxy server 602 is a computer server, network appliance, virtual machine, server cluster, load balancer, serverless computing service, network appliance or other computing resource. In an embodiment, the proxy server 602 hosts a database proxy service 604. In an embodiment, the database proxy service 604 includes a command translation service 606 and a command routing service 608. In an embodiment, the database proxy service interfaces with a network interface 610 to provide an application programming interface to network clients that wish to access the database cluster. In an embodiment, the database proxy service 604 uses the network interface 610 to communicate with various database servers in the database cluster. In an embodiment, the network interface 610 is an Ethernet interface, a fiber-optic interface, a token ring interface, USB interface, a virtual network driver, or serial interface.

In an embodiment, the command translation service 606 maintains a set of translation rules 612. In an embodiment, the set of translation rules 612 may include an inbound proxy dialect 614, a master database dialect 616, and read-replica database dialect 618. In an embodiment, the inbound proxy dialect 614 specifies the command set and syntax of database commands that are to be submitted to the database proxy service 604 by client computer systems. In an embodiment, the master database dialect 616 specifies the command set and syntax used by a master database associated with the database cluster. In an embodiment, the read-replica database dialect 618 specifies a command set and syntax used by a read-replica database in the database cluster. In an embodiment, the database cluster may include a plurality of read-replica databases and each read-replica database may implement a different read database dialect which is specified in the set of translation rules 612. In an embodiment, a dialect is specified using one or more of a syntax specification, a list of supported commands, a database engine version, and a database engine name. In an embodiment, syntax may be specified by providing a lexical analyzer (such as Lex) specification for the command language dialect.

In an embodiment, the command routing service 608 includes a set of command routing rules 620 for each read-replica database and the database cluster. In an embodiment, the command routing rules include a set of compatibility rules 622, a set of load-balancing rules 624, and a set of latency rules 626. In an embodiment, the compatibility rules 622 specify a minimum level of compatibility when converting an incoming database command to an alternate command that is compatible with a particular read-database. In an embodiment, when the command translation service 606 generates an alternate command for an incoming database command, the command translation service 606 returns a level of compatibility for the translation. In an embodiment, if the level of compatibility is less than the minimum level specified by the compatibility rules 622, the alternate command is discarded and the original database command is routed to the master database server in the database cluster. In an embodiment, the set of load-balancing rules 624 specifies a preference order for using read-replica databases. In an embodiment, the command routing service 608 selects a particular read-replica database from a collection of available read-replica databases in the database cluster based at least in part on the set of load-balancing rules 624. In an embodiment, the set of latency rules 626 retains an average latency for each read-replica database in the database cluster. In an embodiment, when a command is submitted to the database cluster by the client computer system, the client computer system may specify a maximum data latency for fulfilling the command. In an embodiment, the command routing service 608 uses the set of latency rules 626 to identify those read-replica database servers that have an acceptable data latency in the database cluster. In an embodiment, only servers having a data latency less than the required maximum will be considered for use as read-replicas.

Figure 7:
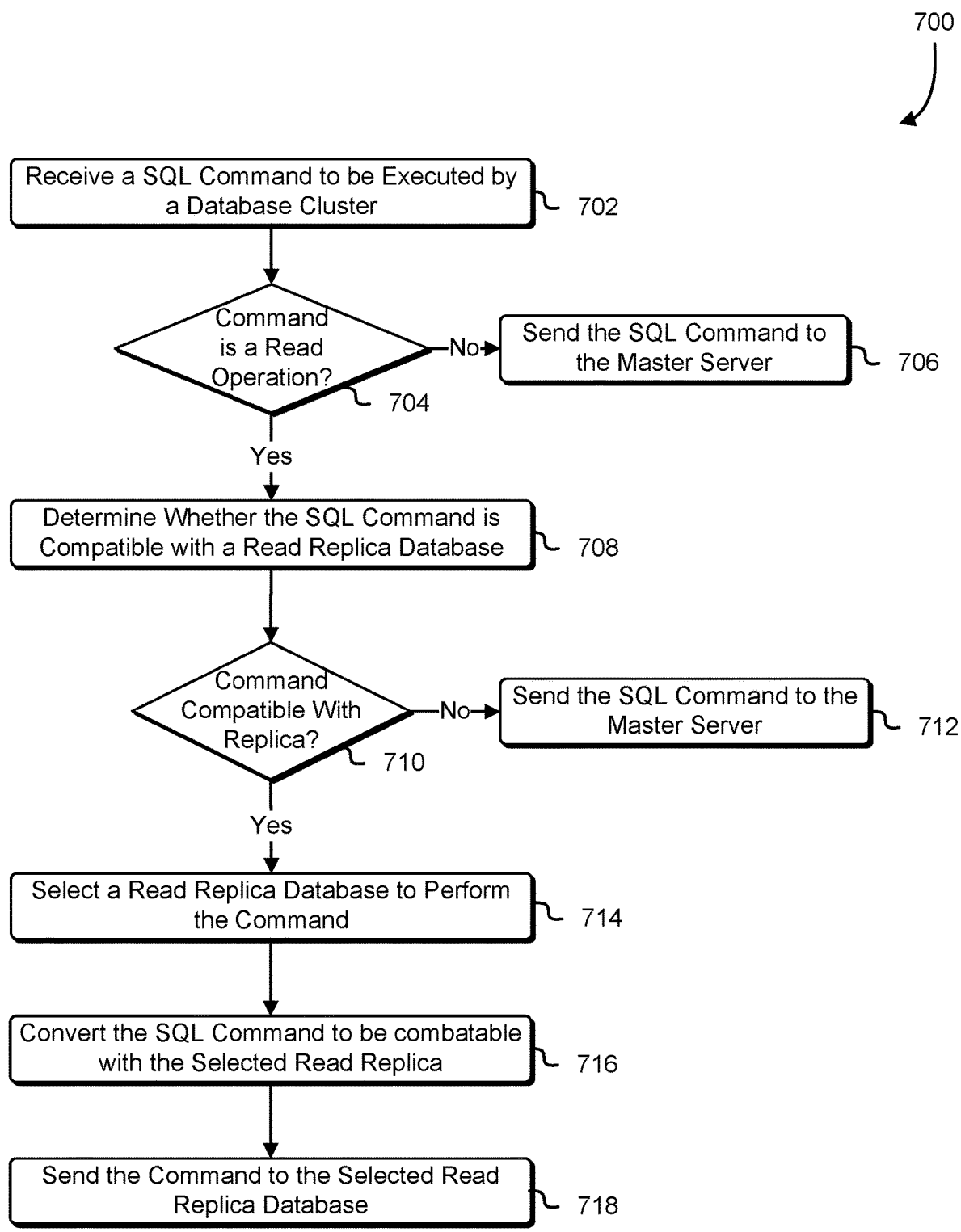
FIG. 7 shows an illustrative example of a process in accordance with one embodiment.

FIG. 7 shows an illustrative example of a process that, as a result of being performed by a proxy server, routes a particular database command to a master database server or an associated read-replica database server. A flowchart 700 illustrates an embodiment of a process that begins at block 702 with a proxy server receiving an SQL command to be executed by a database cluster. In an embodiment, the SQL command may be a DDL or other database command. In an embodiment, the SQL command is received from a client computer system, and the SQL command is formatted to be compatible with the master database of the database cluster.

At decision block 704, in an embodiment, the proxy server determines whether the SQL command is a read operation. In an embodiment, a read operation is a command that, when executed, does not alter the contents of the database. In an embodiment, a read command is a select or query command, and a write command is an update, delete, insert, create, alter, merge, or drop command. In an embodiment, if the proxy server determines that the SQL command is not a read operation, execution advances to block 706 and the proxy server sends the SQL command to the master database in the database cluster. In an embodiment, if the proxy server determines that the SQL command is a read operation, execution advances to block 708.

At block 708, the proxy server determines whether the SQL command is compatible with a read-replica database and the database cluster. In an embodiment, the proxy server sends the SQL command to a translation service, along with information that specifies the command dialect implemented by a read-replica database in the database cluster. In an embodiment, the command service either returns an error (if the SQL command cannot be translated) or an alternate command that is compatible with the read-replica database. In an embodiment, at decision block 710, if an error was produced, execution advances to block 712 and the SQL command is executed on the master database server. In an embodiment, if an alternate command compatible with the read-replica database was produced by the translation service, execution advances to block 714. In an embodiment, at block 714, the proxy server selects a read-replica database from the database cluster. In an embodiment, the read-replica database may be selected based at least in part on the data latency of each read-replica, the processing load of each read-replica, or a configured preference ordering of the read-replicas. In an embodiment where the read replicas implement different command languages, a compatibility measure produced by the command translator is used to select the read replica for which the most compatible alternate command is generated.

At block 716, in an embodiment, the proxy server generates an alternate command that is compatible with the selected read-replica database (if one has not already been generated). In an embodiment, at block 718, the alternate command is sent to the selected read-replica database, and the selected read-replica database executes the alternate command. In an embodiment, results are returned to the proxy server. In an embodiment, the results may be converted into a form consistent with the original SQL command provided by the client computer system, and the converted results are returned to the client computer system.

Figure 8:
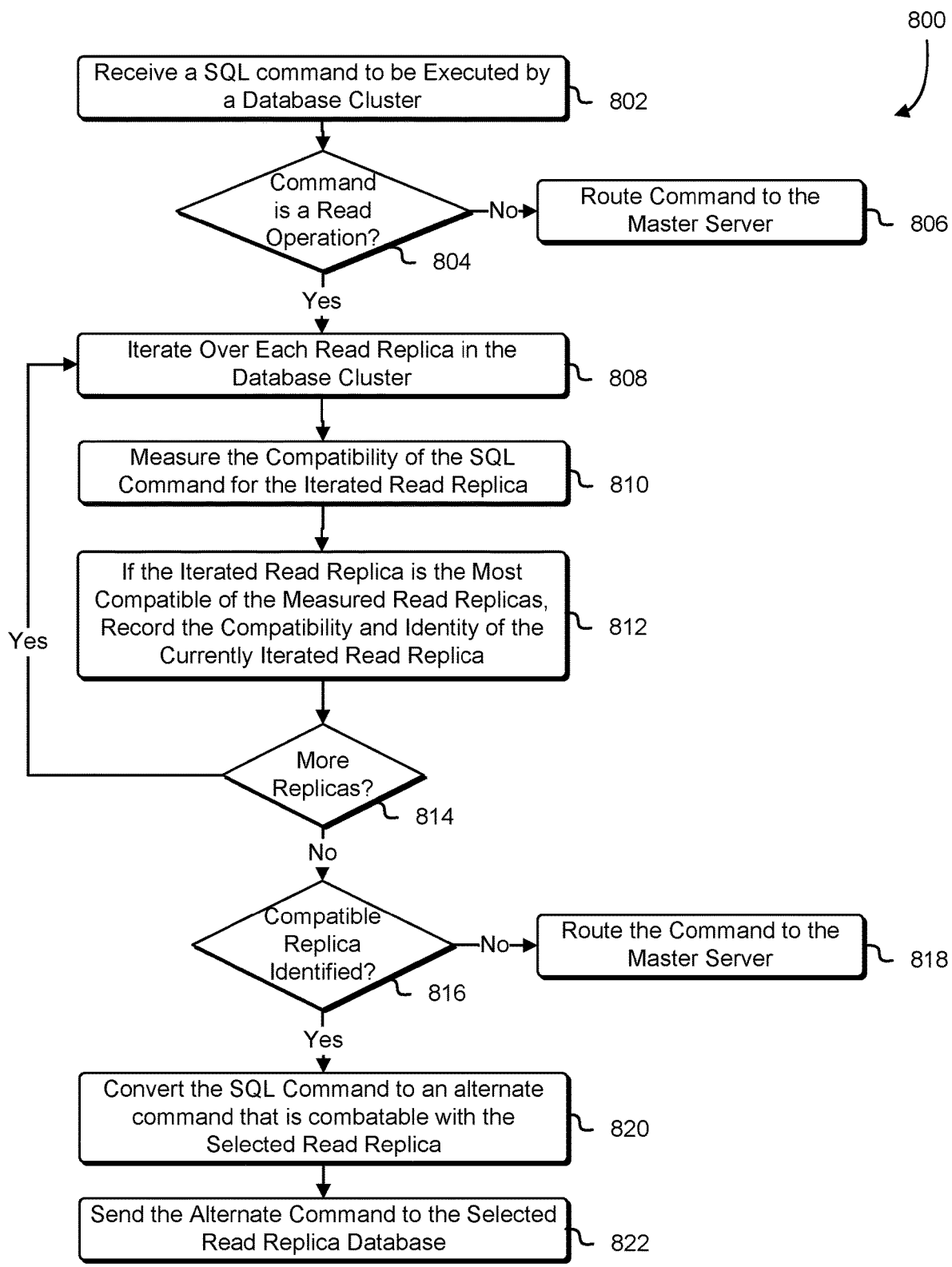
FIG. 8 shows an illustrative example of a process in accordance with one embodiment.

FIG. 8 shows an illustrative example of a process that, as a result of being performed by a proxy server, routes a database command to a master database server or a particular read-replica database server in a collection of read-replica database servers. A flowchart 800 illustrates an embodiment of a process that begins at block 802 with a proxy server receiving an SQL command to be executed on a database cluster. At decision block 804, in an embodiment, the proxy server determines whether the SQL command is a read operation. In an embodiment, a read operation is a command that, when executed, does not alter the contents of the database. In an embodiment, a read command is a select or query command, and a write command is an update, delete, insert, create, alter, merge, or drop command. In an embodiment, if the proxy server determines that the SQL command is not a read operation, execution advances to block 806 and the proxy server sends the SQL command to the master database in the database cluster. In an embodiment, if the proxy server determines that the SQL command is a read operation, execution advances to block 808.

At block 808, the proxy server initiates a loop that iterates over each read-replica database in the database cluster. At block 810, in an embodiment, the proxy server uses a command translation service to measure the compatibility of the SQL command with the iterated read-replica database. In an embodiment, the command translation service returns a numerical measure of the compatibility to the proxy server. At block 812, in an embodiment, the proxy server determines whether the currently iterated read-replica database is the most compatible of the iterated read-replica databases. In an embodiment, the proxy server records the level of compatibility of the most-compatible read-replica database and the identity of the most-compatible read-replica database. At decision block 814, in an embodiment, the proxy server determines if there are additional read-replica databases in the database cluster. If there are more read-replica databases in the database cluster, execution returns to block 808 and the next read-replica database is processed. If there are not more read-replica databases in the database cluster, execution advances to decision block 816.

At decision block 816, in an embodiment, the proxy server determines if the currently identified most compatible read-replica database is capable of being used. In an embodiment, the proxy server determines whether the most-compatible read-replica database has sufficient processing capability, and whether the proposed alternative command can be generated with sufficient compatibility to the original database command. In an embodiment, sufficient compatibility is determined by comparing the level of compatibility for an alternate command to a minimum level of compatibility specified by an administrator. In an embodiment, if the most-compatible read-replica database is not sufficiently compatible, execution advances to block 818 and the proxy server processes the original SQL command using the master database server. In an embodiment, if the most-compatible read-replica database is sufficiently compatible, execution advances to block 820.

At block 820, the proxy server generates an alternate command from the SQL command for the most-compatible read-replica database identified at block 812. In an embodiment, the alternate command is sent 822 to the most-compatible database identified at block 812. In this way, the proxy server is able to identify a particular read-replica database that is most likely to produce a result that matches the execution of the SQL command on the master database. In an embodiment, if results are returned from the read-replica database, the results may be modified in accordance with a result format produced by the master database server.

Figure 9:
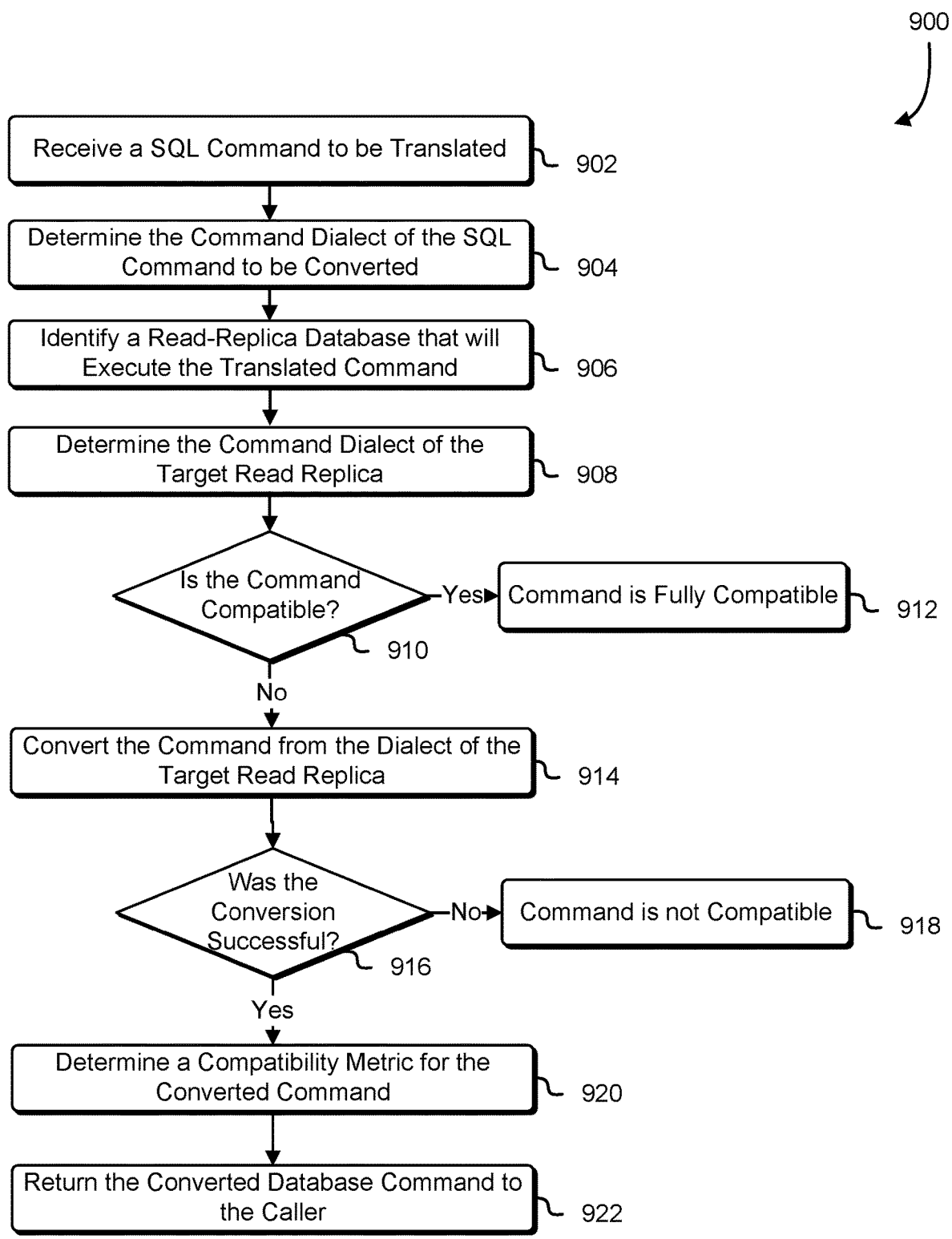
FIG. 9 shows an illustrative example of a process in accordance with one embodiment.

FIG. 9 shows an illustrative example of a process that, as a result of being performed by a command translation service, determines a degree to which a particular database command is able to be converted to a particular command dialect. A flowchart 900 illustrates a process that begins at block 902 with the translation service receiving, from the client computer system, an SQL command to be translated. In an embodiment, at block 904, the translation service determines the command dialect of the incoming SQL command. In an embodiment, the translation service determines the command dialect by identifying a target database server specified by the client providing the SQL command. In an embodiment, the translation service determines the command dialect by examining the SQL command itself. At block 906, in an embodiment, the translation service identifies a particular read-replica database in a database cluster for which the SQL command will be translated. In an embodiment, the particular read-replica database is selected based on the current processing load, a level of compatibility, a cost metric, or a preference rating configured by an administrator. In an embodiment, the translation service identifies 908 a command dialect supported by the particular read-replica database.

At decision block 910, the translation service determines whether the SQL command is compatible with the particular read-replica database as-is. In an embodiment, if the SQL command is compatible with the particular read-replica database, execution advances to block 912 and the SQL command is determined to be fully compatible with the read-replica database. At block 914, in an embodiment, the translation service attempts to generate an alternative command for the SQL command that is compatible with the particular read-replica database. At decision block 916, if the translation was not successful, execution advances to block 918 and the translation service determines that the SQL command is not compatible with the particular read-replica database. If the translation was successful, execution advances to block 920.

At block 920, the translation service determines a compatibility metric for the converted command. In an embodiment, the compatibility metric is based on the length of the original SQL command. In an embodiment, the compatibility metric is based on the length of the resulting converted command. In an embodiment, the compatibility metric is based on the number of tables referenced by the converted command. In an embodiment, the compatibility metric is based on the amount of textual difference between the SQL command and the converted command. At block 922, in an embodiment, the translation service returns the converted command to the proxy server.

Figure 10:
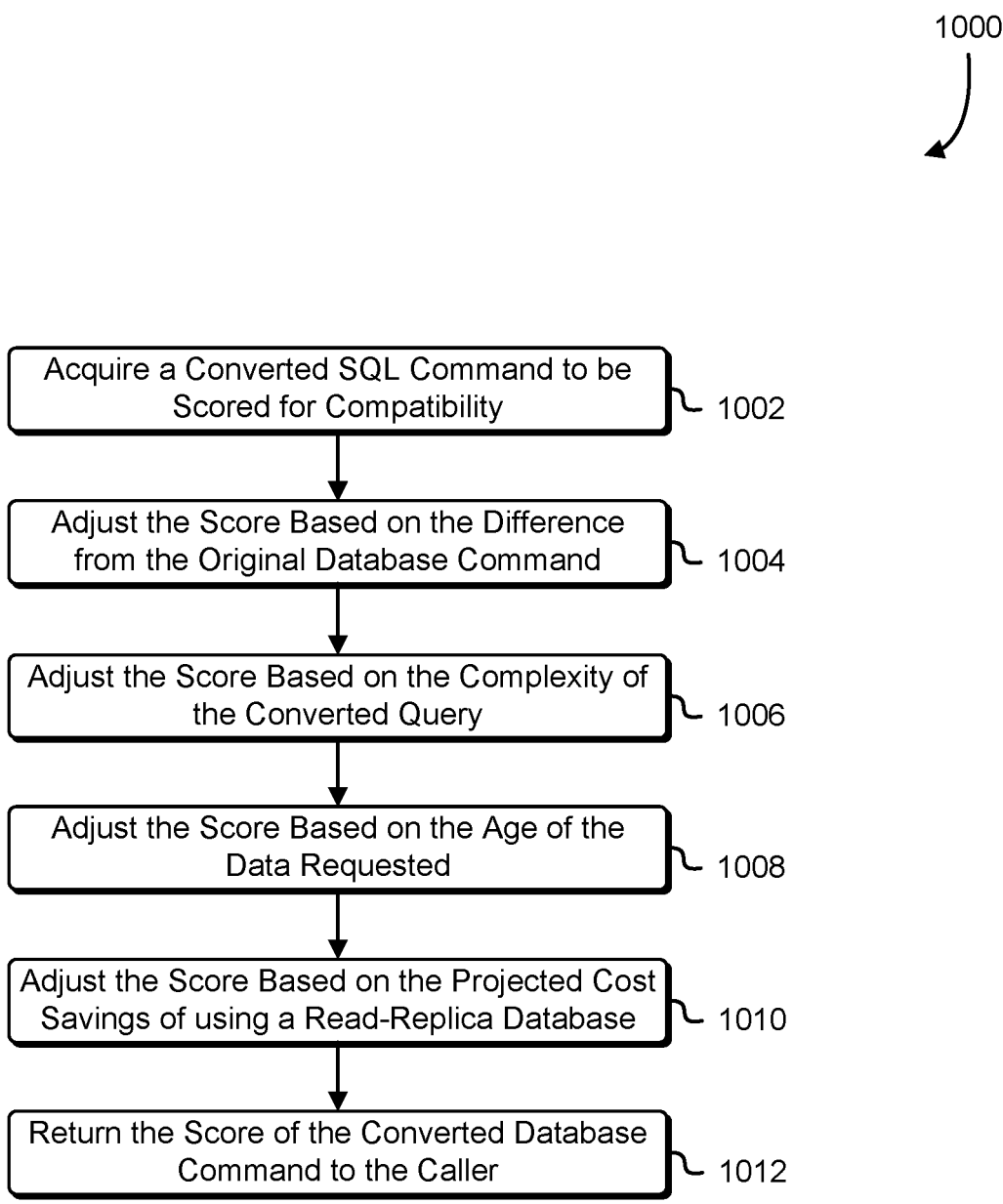
FIG. 10 shows an illustrative example of a process in accordance with one embodiment.

FIG. 10 shows an illustrative example of a process that, as a result of being performed by a proxy server, determines a compatibility score for a converted database command. A flowchart 1000 illustrates an embodiment of a process that begins at block 1002 with the translation service acquiring a converted SQL command to be scored for compatibility with a particular read-replica database server. In an embodiment, the converted SQL command is the result of translating an original SQL command intended for execution on a master database server. In an embodiment, the translation service initializes the compatibility score to a base score based on the successful generation of the converted SQL command. At block 1004, in an embodiment, the translation service adjusts the score based on textual differences between the original SQL command and the converted SQL command. In an embodiment, the score is adjusted to indicate that the command is less compatible as the differences between the original SQL command and the converted SQL command increase. In an embodiment, at block 1006, the translation service adjusts the score based on the complexity of the converted SQL command. In an embodiment, an SQL command is considered to be more complex when the command references more tables, variables, or has more parameters. In an embodiment, at block 1008, the translation service adjusts the score based on the age of the data requested by the converted SQL command. In an embodiment, the longer that the data requested by the converted SQL command has not been modified, the more likely that execution of the converted SQL command on a read-replica database will produce a result that matches execution of the original SQL command on the master database. At block

1010, in an embodiment, the translation service adjusts the score based on a projected cost difference of executing the converted SQL command on a read-replica database compared to a projected cost of executing the original SQL command on the master database. In an embodiment, if the translation service predicts greater projected savings using a read-replica database, the compatibility score is increased. At block 1012, the translation service returns the final compatibility score to the proxy server.

Figure 11:
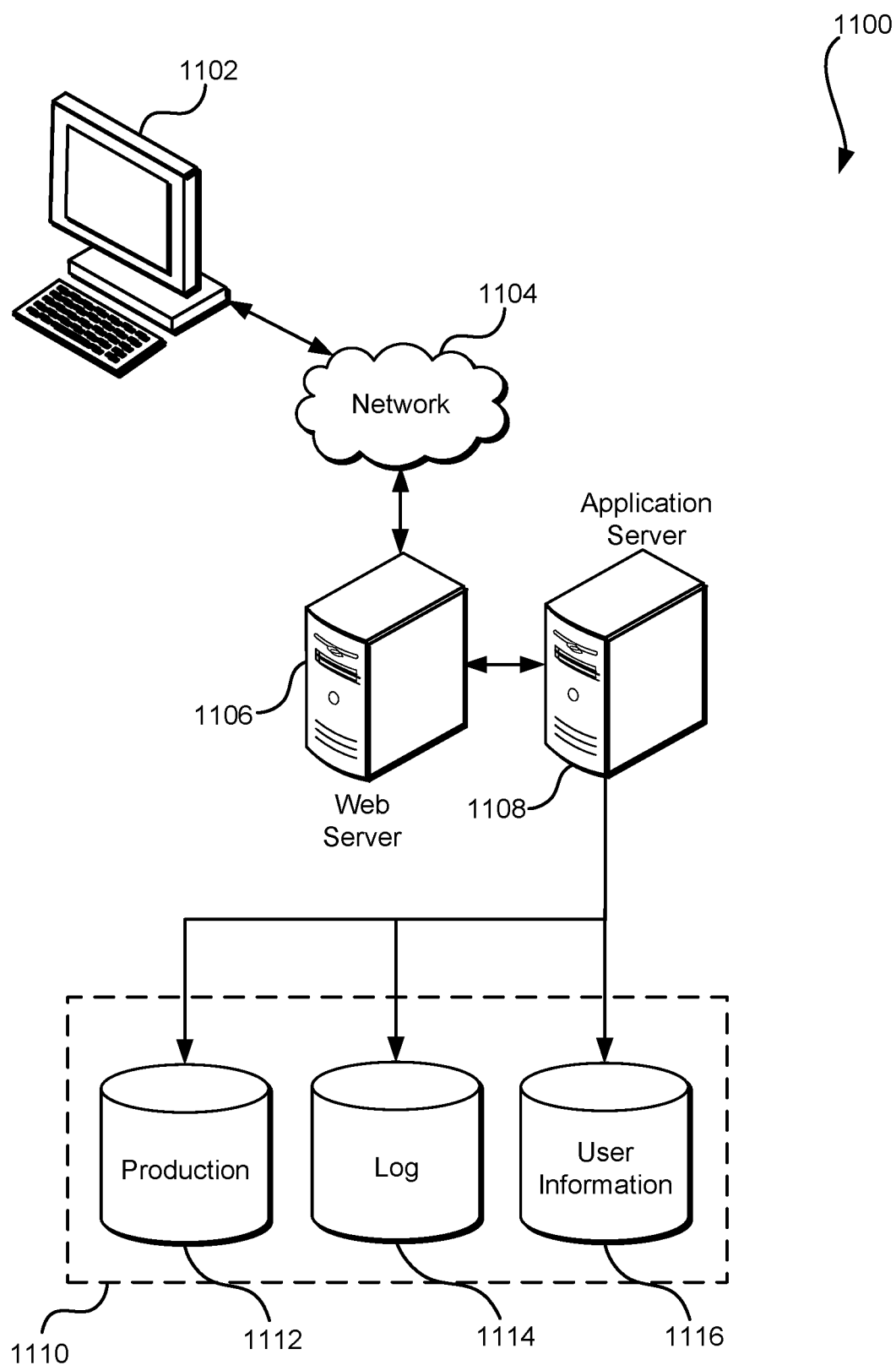
FIG. 11 illustrates a system in which various embodiments can be implemented.

FIG. 11 illustrates a system 1100 for implementing aspects in accordance with one embodiment. In one embodiment, a web-based system is used. The system includes an electronic client device 1102, which can include any appropriate device operable to send and/or receive requests, messages, or information over an appropriate network 1104 and, in one embodiment, convey information back to a user of the device. In one embodiment, client devices include personal computers, cell phones, handheld messaging devices, laptop computers, tablet computers, set-top boxes, personal data assistants, embedded computer systems, electronic book readers, and the like. In one embodiment, the network includes any appropriate network, including an intranet, the Internet, a cellular network, a local area network, a satellite network, or any other such network and/or combination thereof. In embodiment, components used for such a system can depend at least in part on the type of network and/or system selected. In one embodiment, communication over the network can be enabled by wired or wireless connections and combinations thereof. In one embodiment, the network includes the Internet and/or publicly addressable communications network, as the system includes a web server 1106 for receiving requests and serving content in response thereto. In one embodiment, an alternative device serving a similar purpose is used for other networks.

In one embodiment, the illustrative system includes at least one application server 1108 and a data store 1110. In one embodiment, there are several application servers, layers, or other elements, processes, or components, which may be chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In one embodiment, the application server can include any appropriate hardware, software, and firmware that integrates with the data store as needed to execute aspects of one or more applications for the client device, handling some or all of the data access and business logic for an application. In one embodiment, the application server provides access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In one embodiment, content transferred to a client device is processed by the client device to provide the content in one or more forms including, but not limited to, forms that are perceptible to the user audibly, visually, and/or through other senses. In one embodiment, the handling of requests and responses, and the delivery of content between the client device 1102 and the application server 1108, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In one embodiment, the data store 1110 includes several separate data tables, databases, data documents, dynamic data storage schemes, and/or other data storage mechanisms and media for storing data relating to a particular aspect of the present disclosure. In one embodiment, the data store illustrated includes mechanisms for storing production data 1112 and user information 1116, which can be used to serve content for the production side. In one embodiment, the data store is shown to include a mechanism for storing log data 1114, which can be used for reporting, analysis, or other such purposes. In one embodiment, other aspects may be stored in the data store, such as page image information and access rights information, which can be stored in any of the above listed mechanisms as appropriate or in additional mechanisms in the data store 1110. In one embodiment, the data store 1110 is operable, through logic associated therewith, to receive instructions from the application server 1108 and obtain, update, or otherwise process data in response thereto. In one embodiment, the application server 1108 provides static, dynamic, or a combination of static and dynamic data in response to the received instructions. In one embodiment, dynamic data, such as data used in web logs (blogs), shopping applications, news services, and other such applications is generated by server-side structured languages as described herein or may be provided by a content management system ("CMS") operating on, or under the control of, the application server. In one embodiment, a user, through a device operated by the user, submits a search request for a certain type of item, and the data store accesses the user information to verify the identity of the user and can access the catalog detail information to obtain information about items of that type, and then the information is returned to the user. In one embodiment, the information is returned as a results listing on a web page that the user is able to view via a browser on the client device 1102. In one embodiment, information for a particular item of interest is viewed in a dedicated page or window of the browser. The present disclosure is not limited to the context of web pages, and may be applicable to processing requests in general where the requests are not requests for content.

In one embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing system utilizing several computer systems and components that are interconnected via communication links, using one or more computer networks or direct connections. In one embodiment, such a system could have a fewer or a greater number of components than are illustrated in FIG. 11. Thus, the depiction of the system 1100 in FIG. 11 should be taken as being illustrative in nature and not limiting to the scope of the disclosure.

An embodiment can be implemented in a wide variety of systems, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In one embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In one embodiment, the protocol is a reliable connection-oriented protocol such as TCP. In one embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In one embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In one embodiment, the server(s) are capable of executing programs or scripts in response to requests from user devices, such as by executing one or more web applications that may be implemented as one or more scripts or programs written in any programming language, such as Java®, C, C #, or C++, or any scripting language, such as Ruby, personal home page ("PHP"), Perl, Python, or test control language ("TCL"), as well as combinations thereof. In one embodiment, the server(s) include one or more database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. In one embodiment, these reside in a variety of locations, such as on a storage medium local to (and/or resident in) one or more of the computers or remote from any or all of the computers across the network. In one embodiment, the information may reside in a storage-area network ("SAN") familiar to those skilled in the art. In one embodiment, files for performing the functions attributed to the computers, servers, or other network devices may be stored locally and/or remotely, as appropriate. In one embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In one embodiment, the system and various devices include a number of software applications, modules, services, or other elements located within at least one working memory device, including an operating system and application programs, such as a client application or web browser. In one embodiment, customized hardware is used and/or particular elements are implemented in hardware, software (including portable software, such as applets), or both. In one embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device.

In the preceding and following description, various techniques are described. For purposes of explanation, specific configurations and details are set forth in order to provide a thorough understanding of possible ways of implementing the techniques. However, the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. Various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain embodiments thereof are shown in the drawings and have been described above in detail. There is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed material (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. In one embodiment, the code is stored on a computer-readable storage medium in the form of a computer program comprising a plurality of instructions executable by one or more processors. The computer-readable storage medium may be non-transitory. In one embodiment, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in one embodiment, the executable instructions are executed such that different instructions are executed by different processors. In one embodiment, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in one embodiment, computer systems are configured to implement one or more services that singly or collectively perform operations of processes described herein. Such computer systems may, for instance, be configured with applicable hardware and/or software that enable the performance of the operations. In one embodiment, a computer system is a single device. In one embodiment, a computer system is a distributed computer system comprising multiple devices that operate such that the distributed computer system performs the described operations and a single device might not perform all of the described operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art on reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
receiving a database command for an operation to be processed by a database cluster, the database cluster including a master database and a read-replica database of the master database, the database command compatible with the master database and incompatible with the read-replica database;
determining that the database command is capable of being translated into a form that is compatible with the read-replica database;
translating the database command into another database command that is compatible with the read-replica database;
generate a compatibility score that represents a likelihood that the other database command is a correct translation of the database command; and
as a result of the compatibility score reaching a value relative to a threshold, routing the other database command to the read-replica database.

2. The method of claim 1, wherein determining that the database command is capable of being translated into a form that is compatible with the read-replica database is accomplished at least in part by:
determining that the database command, if executed, would not modify database information retained on the database cluster.

3. The method of claim 1, further comprising:
identifying a set of compatible read-replica databases from a plurality of read-replica databases that are members of the database cluster; and
selecting the read-replica database from the set of compatible read-replica databases.

4. The method of claim 1, wherein translating the database command is accomplished at least in part by:
identifying a source command dialect of the database command;
identifying a destination command dialect of the read-replica database;
submitting the database command, the source command dialect, and the destination command dialect, to a translation service; and
receiving the other database command from the translation service.

5. The method of claim 1, further comprising:
receiving a result from the read-replica database;
producing a modified result by modifying the result in accordance with a format produced by the master database; and
providing the modified result to a database client.

6. A system, comprising:
one or more processors; and
memory storing computer-executable instructions that, if executed, cause the system to:
receive a first database command compatible with a first database and incompatible with a second database;
select, based at least in part on a determination that the first database command will not change the first database, a second database from a cluster of databases, the cluster comprising the first database and the second database;
translate the first database command to produce a translated command for execution against the second database;
generate a compatibility score that represents a likelihood that the translated command is a correct translation of the first database command;
on a condition that the compatibility score is less than a threshold value, execute the first database command against the first database; and
on a condition that the compatibility score exceeds the threshold value, transmit the translated command to the second database.

7. The system of claim 6, wherein the executable instructions further include instructions that further cause the system to receive the threshold value from an entity that submitted the first database command.

8. The system of claim 6, wherein the computer-executable instructions further cause the system to:
receive a result from the second database, the result in accordance with a result-format supported by the second database; and
translate the result into a translated result, the translated result in a result-format supported by the first database.

9. The system of claim 6, wherein the computer-executable instructions further cause the system to:
determine that the first database command modifies data stored on the first database; and
execute the first database command against the first database.

10. The system of claim 6, wherein:
the first database supports a first command set;
the second database supports a second command set; and
the first command set differs from the second command set.

11. The system of claim 6, wherein the computer-executable instructions further cause the system to:
determine that the second database has a data latency that exceeds a threshold amount; and
as a result of having determined that the second database has a data latency that exceeds the threshold amount, execute the first database command against the first database.

12. The system of claim 6, wherein the computer-executable instructions further cause the system to:
maintain a set of database characteristics for a set of read-replica databases, the set of database characteristics including a cost of operation, a reliability measure, a processing capacity, a current status, and a preference ranking for each read-replica database of the set of read-replica databases; and
select a particular database from the set of read-replica databases based at least in part on the set of database characteristics.

13. A non-transitory computer-readable storage medium storing thereon executable instructions that, as a result of execution by one or more processors of a computer system, cause the computer system to at least:
receive a first database command for execution on a first database;
select a second database based at least in part on a determination that the first database command is a read command;
determine that the first database command is capable of being translated into an alternate command that is compatible with a second database;

generate a score that represents a likelihood that the alternate command is a compatible translation of the first database command;

as a result of the score reaching a first value relative to a threshold value, execute the alternate against the first database to fulfill the first database command; and as a result of the score reaching a second value relative to a threshold value, execute the alternate command against the second database to fulfill the first database command.

14. The non-transitory computer-readable storage medium of claim 13, wherein the instructions further comprise instructions that, as a result of being executed by the one or more processors, cause the computer system to:

receive results from the second database; and modify the results in accordance with a result format produced by the first database.

15. The non-transitory computer-readable storage medium of claim 13, wherein:

the first database command is a structured query language command; and the first database command is determined to be translatable by determining that the first database command does not perform a write operation.

16. The non-transitory computer-readable storage medium of claim 13, wherein:

the first database stores a set of data that is provided to the second database; and the second database maintains a copy of the set of data, and makes the copy of the set of data accessible to a client computer system.

17. The non-transitory computer-readable storage medium of claim 13, wherein the first database and the second database are arranged as a heterogeneous database cluster.

18. The non-transitory computer-readable storage medium of claim 13, wherein the instructions further comprise instructions that, as a result of being executed by the one or more processors, cause the computer system to further determine that a latency of the second database exceeds a threshold amount.

19. The non-transitory computer-readable storage medium of claim 13, wherein:

the first database supports a first command set;

the second database supports a second command set; and the first command set differs from the second command set.

20. The non-transitory computer-readable storage medium of claim 13, wherein the executable instructions further include instructions that further cause the computer system to receive the threshold value from an entity that submitted the first database command.

* * * * *